United States Patent [19]

Humpal

[11] Patent Number: 5,242,193
[45] Date of Patent: Sep. 7, 1993

[54] PORTABLE AIR BAG

[76] Inventor: Richard J. Humpal, 1238 Mohave, Colton, Calif. 92324

[21] Appl. No.: 854,404

[22] Filed: Mar. 19, 1992

[51] Int. Cl.$^5$ .............................................. B60R 21/18
[52] U.S. Cl. ...................................... 280/733; 222/3
[58] Field of Search ............... 280/733, 728; 251/66; 222/3

[56] References Cited

U.S. PATENT DOCUMENTS

| | | | |
|---|---|---|---|
| 1,076,647 | 10/1913 | Welman | 251/66 |
| 2,778,599 | 1/1957 | Paul, Jr. | 251/66 |
| 3,682,498 | 8/1972 | Rutzki | 280/733 |
| 3,703,702 | 11/1972 | Arai . | |
| 4,059,852 | 11/1977 | Crane | 280/733 |
| 4,111,458 | 9/1978 | Okada et al. . | |
| 4,765,569 | 8/1988 | Higgins . | |
| 4,846,368 | 7/1989 | Goetz . | |
| 4,913,461 | 4/1990 | Cuevas . | |
| 4,971,354 | 11/1990 | Kim | 280/733 |

FOREIGN PATENT DOCUMENTS 3820145  1/1990  Fed. Rep. of Germany ...... 280/733

Primary Examiner—Karin L. Tyson
Attorney, Agent, or Firm—Shelden & Mak

[57] ABSTRACT

A self-contained inflatable air bag apparatus that can be effectively used in virtually any vehicle having seat belts. The apparatus includes a base connected to the restraining belt; an inflatable air bag carried by the base; a source of pressurized gas; and a trigger responsive to a predetermined tensile loading of the belt for connecting the source of gas to the air bag, the air bag being expansively deployed for crash-protection of the occupant upon occurrence of the predetermined tensioning of the belt. The base can form a spaced pair of belt contacting surfaces for contacting a first side of the belt, the trigger including a post for contacting an opposite, second side of the belt between the belt contacting surfaces of the base, the belt pressing against the post in response to the tensile loading, the post being moved in response to a predetermined magnitude of the tensile loading; and a valve connected between the gas source and the air bag and responsive to movement of the post for pressurizing the air bag. Preferably the apparatus includes a detent member that can biasing engage with the post, the post not being moved when the tensile loading is less than the predetermined magnitude. An indicator can display an estimated mass of the occupant, and a preload adjustment coupled to the indicator can set the preloading in correspondence with the indicator, whereby the predetermined magnitude of the tensile loading is directly related to the estimated mass.

7 Claims, 2 Drawing Sheets

PORTABLE AIR BAG

BACKGROUND

The present invention is directed to vehicle safety restraints commonly known as "air-bags" that automatically deploy when the vehicle begins to encounter high decelerations that are associated with a crash.

Air bags are known to be effective in reducing injuries to occupants of crashing vehicles, being standard or optional equipment by most vehicle manufacturers. Conventional air bags are packaged permanently within a central portion of the driver's steering wheel, on or within a passengers dashboard, or on the back of a seat for rear seat passengers. Air bags are considered effective for mitigating injury to vehicle occupants when they are used in conjunction with seat belts, seat belts being needed most particularly for oblique and side impact collisions.

Unfortunately, many vehicles are not equipped with air bags, and many vehicles have air bags only for the driver, or front seat occupants only. Further, retrofitting conventional air bags to existing vehicles is impractical in most cases, even when the vehicle is one for which air bags are optional. Moreover, there are many occasions for people to ride in or drive an existing vehicle that is not equipped with air bags. In such cases, it is out of the question to covert the vehicle on the spur of the moment.

Thus there is a need for an air bag that is effective when used for drivers as well as front and rear seat passengers in existing vehicles, without regard to vehicle manufacturer's options, that can be installed very quickly and easily, and that is inexpensive to produce.

SUMMARY

The present invention meets this need by providing a self-contained air bag apparatus that can be effectively used in virtually any vehicle having seat belts. The apparatus includes a base for connection to the restraining belt; an inflatable air bag member carried by the base; a source of pressurized gas; and trigger means responsive to a predetermined tensile loading of the belt for connecting the source of gas to the air bag member, the air bag member being expansively deployed for crash-protection of the occupant upon occurrence of the predetermined tensioning of the belt.

The base can form a spaced pair of belt contacting surfaces for contacting a first side of the belt, the trigger means including a post for contacting an opposite, second side of the belt between the belt contacting surfaces of the base, the belt pressing against the post in response to the tensile loading; means for permitting movement of the post in response to a predetermined magnitude of the tensile loading; and a valve connected between the source and the bag member and responsive to movement of the post for pressurizing the bag member. Preferably the apparatus further includes a detent member and biasing means for biasingly engaging the detent member with the post, the biasing means having a predetermined preloading for preventing movement of the post when the tensile loading is less than the predetermined magnitude. The apparatus can further include indicator means for displaying an estimated mass of the occupant, and preload adjustment means coupled to the indicator means for setting the preloading in correspondence with the indicator means, whereby the predetermined magnitude of the tensile loading is directly related to the estimated mass. The post can extend on a post axis from a post platform that is movably connected to the base, the detent member releasably engaging an end discontinuity of the post, the biasing means urging the detent member toward the platform. At least one of the belt contacting surfaces can be formed by a column member that is movably connected to the base for engagement of the apparatus with the belt by access to one side only of the trigger means.

The valve can include a valve body having a feed passage extending between an inlet and an outlet of the body, a support passage intersecting the feed passage; a gate member slidably engaging the support passage and extending between opposite sides of the feed passage, the gate member being connected to the post for movement from the feed passage in response to movement of the post; and a closure member sealingly blocking the feed passage proximate the support passage, the closure member being supported against the pressurized gas of the source by the gate member, the gas pressure moving the closure member for at least partially unblocking the feed passage when the gate member moves from the feed passage.

In another aspect of the invention, the apparatus can include frame means for application to the restraining belt and having a spaced pair of belt contacts thereon; a retainer member connected to the frame for holding the frame means in engagement with the belt, the belt being confined by the retainer member to a nonlinear profile between the belt contacts of the frame member; the source of pressurized gas; and means responsive to loading of the retainer member by a predetermined tensioning of the belt for connecting the pressurized gas to the air bag member.

DRAWINGS

These and other features, aspects, and advantages of the present invention will become better understood with reference to the following description, appended claims, and accompanying drawings, where:

DESCRIPTION

Figure 1:
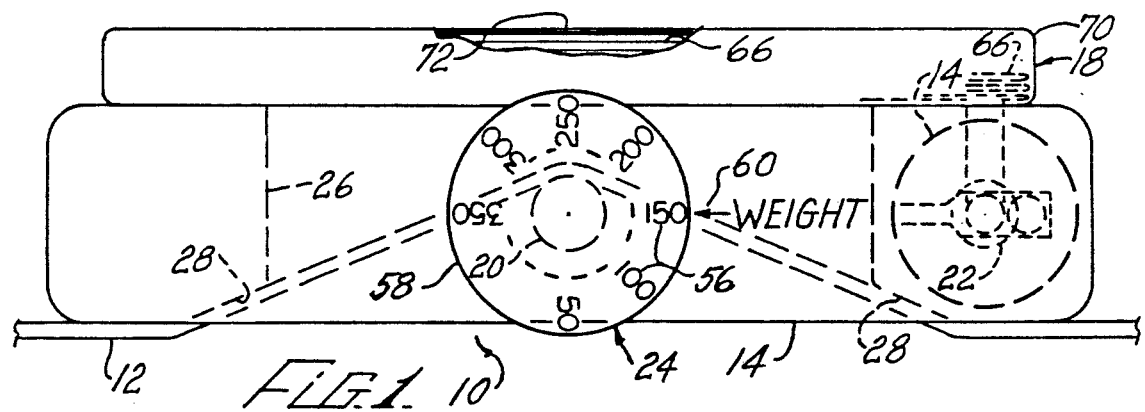
FIG. 1 is a side elevational view of a portable air bag apparatus in place on a vehicle seat belt according to the present invention.
Figure 2:
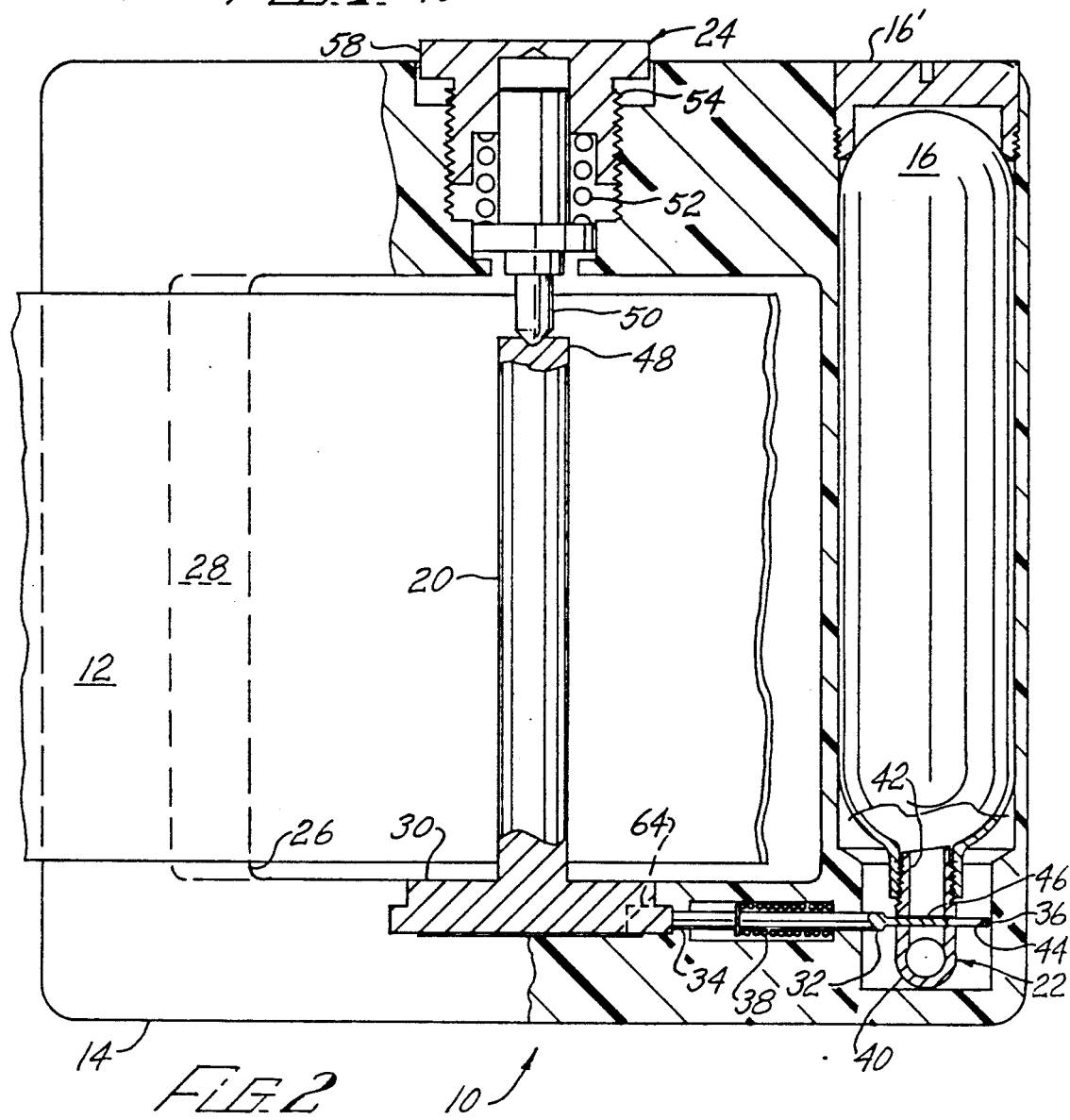
FIG. 2 is a fragmentary bottom plan sectional view of the apparatus of FIG. 1.

The present invention is directed to a portable air bag unit for use on a vehicle seat belt. With reference to FIGS. 1-5 of the drawings, an air bag unit 10 engages a vehicle seat belt member 12, the unit 10 having a base or frame 14 for mounting a high-pressure gas reservoir 16, the reservoir 16 being retained within the frame 14 by a reservoir retainer 16'. The air bag unit 10 also includes a packed bag assembly 18, a trigger post 20, a control valve 22 for rapidly filling the bag assembly 18 from the reservoir 16, and an adjustable detent mechanism 24, further described below. The post 20 extends within a frame opening 26, the belt member 12 contacting a spaced pair of belt pad surfaces 28 of the frame 14 on opposite sides of the post 20 and looping around the post 20, so that tension applied to the belt member 12 produces a corresponding, approximately proportional pressure against the pad surfaces 28 and the post 20.

According to the present invention, the post 20 has an enlarged base portion 30 being slidably mounted to the frame 14, a movable valve member 32 of the valve 22 being locked in a closed position when the trigger post 20 is in a normal position within the frame 14, the normal position being releasably maintained by the detent mechanism 24 as described below.

The valve member 32 includes a rod extension 34, and a blade-shaped gate portion 36, a helical compression spring 38 axially biasing the rod extension 34 toward the base portion 30 of the post 20. The gate portion 36 slidably engages a valve body 40 of the valve 22, the gate portion 36 spanning a feed passage 42 of the body 40 and having a gate opening 44 that becomes aligned with the passage 42 when the valve member 32 moves to an open position in response to movement of the post 20 from the rest position. A thin fracturable closure member 46 is sealingly bonded to the valve body 40 immediately upstream of the gate portion 36, the gate portion 36 in its closed position supporting the closure member 46 against gas pressure from the reservoir 16, the gas pressure at least partially breaking or tearing the closure member 46 from the body 40 when the valve member 32 moves to its open position.

The post 20 has a cone-shaped end extremity 48 that engages a corresponding detent member 50 of the detent mechanism 24, the detent member 50 being adjustably axially biased by a detent spring 52 against the post 20, the spring 52 being supported by a plug member 54 that also guides the detent member 50. The shapes of the end extremity 48 and the detent member 50 and the loading by the detent spring 52 are selected for preventing movement of the post 20 until the belt member 12 is loaded with a predetermined tension, the predetermined tension being greater that what would be encountered in normal use of the seat belt member 12, but less than what would occur during the initial stages of a crash.

The plug member 54 threadingly engages the frame 14 for effecting adjustment of the detent spring 52. A set of weight indicia 56 are provided on a knob portion 58 of the plug member 54, and a reference indication 60 is formed on the frame 14 for preloading the detent member 50 according to an estimated mass equivalent weight of a user or occupant 62 of the unit 10. Typically, and as shown most clearly in FIG. 1, the indicia 56 range from 50 pounds to 350 pounds, the preloading being adjustable for use by those weighing from under 50 pounds to over 350 pounds.

Figure 5:
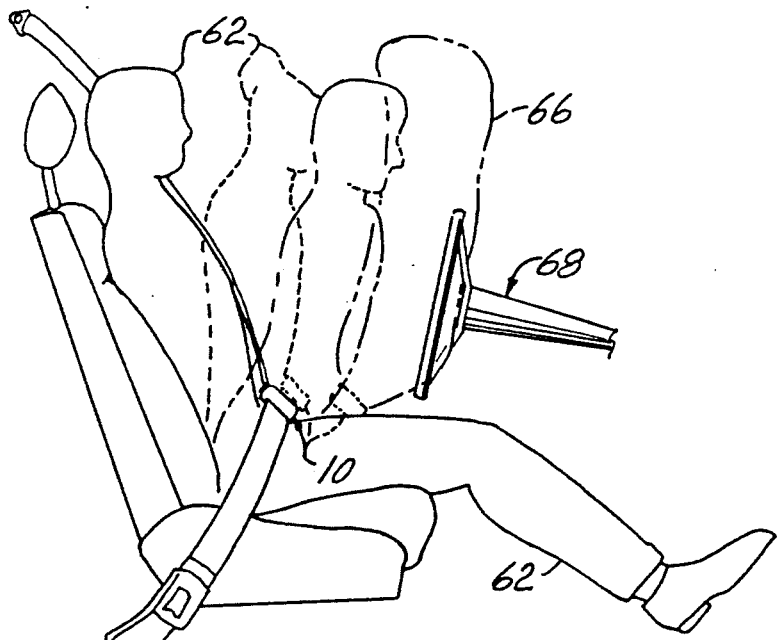
FIG. 5 is a side elevational view showing the apparatus of FIG. 1 being used in a vehicle.

During a crash, as the vehicle encounters severe decelerator forces, the occupant 62 begins to move relative to an initial seating position as indicated by the solid lines in FIG. 5, the belt member 12 quickly being tensioned by the occupant 62 in excess of the predetermined tension, the occupant 62 having moved as indicated by the dotted lines in FIG. 5. As described above, gas pressure to the bag assembly 18 is triggered by movement of the post 20 from its rest potion in engagement with the detent member 50 (as indicated by the solid line in FIG. 4, wherein the rod extension 34 snaps into a trigger cavity 64 that is formed in the base portion 30 of the post 20.

Figures 3, 4:
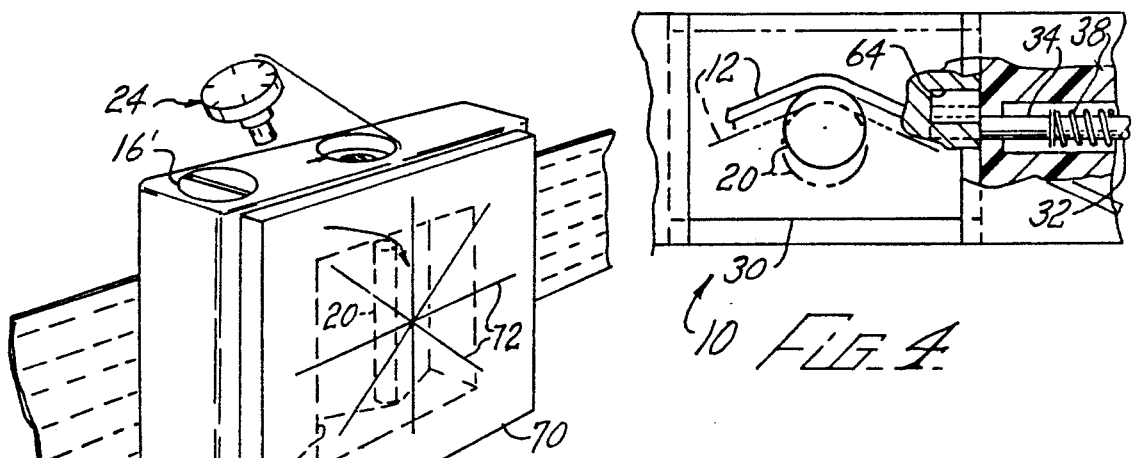
FIG. 3 is a front oblique perspective view of the apparatus of FIG. 1.
FIG. 4 is a fragmentary sectional detail view of a portion of the apparatus of FIG. 1.

Upon the opening of the valve 22, gas pressure rapidly fills the bag assembly 18, the assembly 18 having a bag member 66 that is thereby deployed as indicated by the dashed lines in FIG. 4, for supporting the occupant 62, the bag member 66 being interposed between the occupant 62 and a structural element such as a steering column and wheel unit 68 of the vehicle.

The bag assembly 18 includes a cover member 70 for holding the bag member 66 in its packed condition against the frame 14, the cover member 70 having a pattern of slits 72 formed therein, the slits 72 permitting the cover member 70 to flex, creating an opening for passage of the bag member 66 therethrough when the high-pressure gas is triggered as described above. The cover member 70 can be formed of a suitable thermoplastic material, the slits 72 being partially ultrasonically welded shut for maintaining a smooth, compact outer profile of the cover member 70 until the unit 10 is triggered by a crash.

As further shown in FIG. 3, the plug member 54, together with the detent member 50 and spring 52 can be unscrewed from the frame 14 for permitting the belt member to be looped over the post 20. This simple procedure does not require tools. Accordingly, the air bag unit 10 of the present invention is truly portable.

In typical vehicles, the bag assembly 18 can have an inflated volume of from about three to about 3.5 cubic feet for effective crash protection of a driver of the vehicle. For use by passengers of the vehicle, the bag assembly 18 should normally have greater volume, such as from about six to about seven cubic feet. The reservoir 16 is configured for rapid delivery of the inflated volume at slightly above atmospheric pressure, the reservoir 16 holding a much smaller volume of gas at a much higher pressure, normally several thousand psi.

Figure 6:
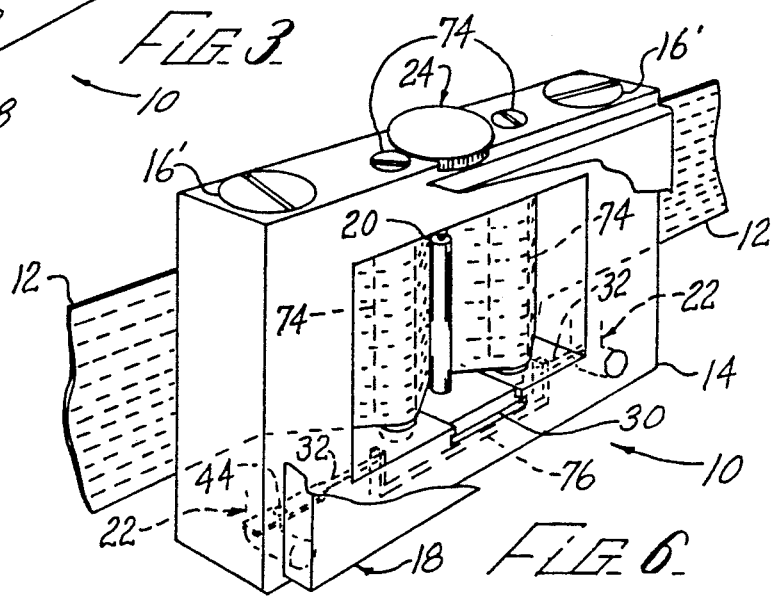
FIG. 6 is a front oblique perspective view showing an alternative configuration of the apparatus of FIG. 1.

With further reference to FIG. 6, an alternative configuration of the air bag unit 10 as a pair of column members 74 that are removably fastened to the frame 14 for permitting the unit 10 to be connected onto the belt member 12 without requiring displacement of the detent mechanism 24. Instead, the column members 74 are removable from the frame 14 individually as shown in FIG. 6 (or removable as a separate portion of the frame 14 from those portions connecting the detent mechanism 24 and the base portion 30 of the post 20). The column members 74 can have threaded engagement with the frame 14, detented axial engagement, or other suitable connection, preferably having supportive locating engagement at opposite side extremities of the frame opening 26 as shown in FIG. 6. Accordingly, displacement of the detent mechanism 24 for permitting coupling to the belt member 12 is not required because the belt member 12 is engagable as described above with access to one side only of the trigger post 20.

As further shown in FIG. 6, the unit 10 can be provided with a pair of the reservoirs 16, as indicated by a corresponding pair of the retainer 16', each reservoir 16 being fluid connected to the bag assembly 18 by counterparts of the valve 22, including the valve member 32 having the gate portion 36 and the gate opening 44 therein. The respective valve members 32 can be connected for simultaneous operation by a valve connector 76. The unit 10 in the configuration of FIG. 6 can be interchangeably fitted with the bag assembly 18 having differently sized bag members 66, one or both of the reservoirs 16 being loaded therein according to the capacity of the bag member 66, for use of the air bag unit 10 selectively at driver and passenger positions of the vehicle.

Although the present invention has been described in considerable detail with reference to certain preferred versions thereof, other versions are possible. For example, the air bag unit 10 can be provided with a safety interlock for mechanically blocking movement of the post 20 from its rest position when the unit 10 is not connected and adjusted according to the estimated weight of the occupant 62. The safety interlock can have a manual control like a firearm safety, or the interlock can be coupled to the detent mechanism 24 for automatically blocking the movement of the post 20 when the detent mechanism 24 is not in place and adjusted within the range of weight equivalents corresponding to the predetermined triggering tension loadings of the belt member 12 as described above. Also, the frame 14 can be provided with a clamp member for securing the unit 10 at a desired location along the belt member 12. Further, the unit 10 in the configuration of FIG. 6 is operable with one only of the column members 74. Therefore, the spirit and scope of the appended claims should not necessarily be limited to the description of the preferred versions contained herein.

What is claimed is:

1. The apparatus wherein the base forms a spaced pair of belt contacting surfaces for contacting a first side of the belt, and the trigger means comprises:
   (a) a post for contacting an opposite, second side of the belt between the belt contacting surfaces of the base, the belt pressing against the post in response to the tensile loading;
   (b) means for permitting movement of the post in response to a predetermined magnitude of the tensile loading; and
   (c) a valve connected between the source and the bag member and responsive to movement of the post for pressurizing the bag member.

2. The apparatus of Claim 1, further comprising a detent member and biasing means for biasingly engaging the detent member with the post, the biasing means having a predetermined preloading for preventing movement of the post when the tensile loading is less than the predetermined magnitude.

3. The apparatus of claim 2, further comprising indicator means for displaying an estimated of the occupant, and preload adjustment means coupled to the indicator means for setting the preloading correspondence with the indicator means, whereby the predetermined magnitude of the tensile loading is direct to the estimated mass.

4. The apparatus of claim 2, wherein the post extends on a post axis from a post platform, the post platform being movably connected to the base, the detent member releasably engaging an end discontinuity of the post, the biasing means urging the detent member the platform.

5. The apparatus of claim 1, at least one of the belt contacting surfaces is formed b column member, the column member being movably con to the base for engagement of the apparatus with t by access to one side only of the trigger means.

6. The apparatus of claim 1, wherein the valve comprises:
   (a) a valve body having a feed extending between an inlet and an outlet of the body, passage intersecting the feed passage;
   (b) a gate member slidably engaging support passage and extending between opposite sides the feed passage, the gate member being connected to post for movement from the feed passage in response to movement of the post; and
   (c) a closure member sealingly blocking the feed passage proximate the support passage, the closure member being supported against the pressurized gas of the source by the gate member, the gas pressure moving the closure member for at least partially unblocking the feed passage when the gate member moves from the feed passage.

7. A portable inflatable air bag apparatus for use in a vehicle having a restraining belt for an occupant of the vehicle, the apparatus comprising:
   (a) a base for connection to the restraining belt, the base forming a spaced pair of belt contacting surfaces for contacting a first side of the belt;
   (b) an inflatable air bag member carried by the base;
   (c) a source of pressurized gas;
   (d) trigger means responsive to a predetermined tensile loading of the belt for connecting the source of gas to the air bag member, the trigger means comprising:
      (i) a post for contacting an opposite, second side of the belt between the belt contacting surfaces of the base, the belt pressing against the post in response to the tensile loading, the post extending on a post axis from a post platform, the post platform being movably connected to the base;
      (ii) means for permitting movement of the post in response to a predetermined magnitude of the tensile loading; and
      (iii) a valve connected between the source and the bag member and responsive to movement of the post for pressurizing the bag member;
   (e) a detent member and biasing means for biasingly engaging the detent member with the post, the biasing means having a predetermined preloading for preventing movement of the post when the tensile loading is less than the predetermined magnitude, the detent member releasably engaging an end discontinuity of the post, the biasing means urging the detent member toward the platform;
   (f) indicator means for displaying an estimated mass of the occupant, and preload adjustment means coupled to the indicator means for setting the preloading in correspondence with the indicator means,
whereby the predetermined magnitude of the tensile loading is directly related to the estimated mass, the air bag member being expansively deployed for crash-protection of the occupant upon occurrence of the predetermined tensioning of the belt.

* * * * *